US010060263B2

(12) United States Patent
Van Ness et al.

(10) Patent No.: US 10,060,263 B2
(45) Date of Patent: Aug. 28, 2018

(54) INCIDENCE-TOLERANT, HIGH-TURNING FAN EXIT STATOR

(71) Applicant: United Technologies Corporation, Hartford, CT (US)

(72) Inventors: Daniel K. Van Ness, Middletown, CT (US); Mark A. Stephens, Wethersfield, CT (US); Edward J. Gallagher, West Hartford, CT (US); Joseph C. Straccia, Middletown, CT (US); Vikram A. Kumar, New Haven, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 483 days.

(21) Appl. No.: 14/827,059

(22) Filed: Aug. 14, 2015

(65) Prior Publication Data
US 2016/0076380 A1 Mar. 17, 2016

Related U.S. Application Data

(60) Provisional application No. 62/050,543, filed on Sep. 15, 2014.

(51) Int. Cl.
*F02C 1/00* (2006.01)
*F01D 5/14* (2006.01)
(Continued)

(52) U.S. Cl.
CPC .............. *F01D 5/141* (2013.01); *F01D 5/142* (2013.01); *F01D 9/041* (2013.01); *F02C 3/04* (2013.01);
(Continued)

(58) Field of Classification Search
CPC .......... F01D 5/141; F01D 5/142; F01D 5/148; F01D 5/143
See application file for complete search history.

(56) References Cited

U.S. PATENT DOCUMENTS 5,706,647 A * 1/1998 Frey ................ F01D 5/141
415/209.3
6,195,983 B1 * 3/2001 Wadia ............... F01D 5/141
415/208.1

(Continued)

FOREIGN PATENT DOCUMENTS

EP 1905952 4/2008
EP 1930600 6/2008
EP 2199543 6/2010

OTHER PUBLICATIONS

Extended European Search Report dated Feb. 17, 2016 in European Application No. 15183680.6.

Primary Examiner — Gerald L Sung
(74) Attorney, Agent, or Firm — Snell & Wilmer, L.L.P.

(57) ABSTRACT

A gas turbine engine component is described. The gas turbine engine component includes an inner diameter edge, an outer diameter edge, a trailing edge and a leading edge. The leading edge has a positive (aft) aerodynamic sweep across substantially an entire span of the leading edge. The gas turbine engine component has a camber angle greater than 50 degrees across substantially an entire span of the component. The gas turbine engine component may have asymmetrical tangential stacking of the component in the radial direction.

16 Claims, 10 Drawing Sheets

(51) Int. Cl.
  *F01D 9/04*   (2006.01)
  *F02C 3/04*   (2006.01)
  *F04D 29/32*  (2006.01)
  *F04D 29/54*  (2006.01)

(52) U.S. Cl.
  CPC ......... *F04D 29/324* (2013.01); *F04D 29/544* (2013.01); *F05D 2220/32* (2013.01); *F05D 2220/323* (2013.01); *F05D 2240/121* (2013.01); *F05D 2240/122* (2013.01); *F05D 2240/301* (2013.01); *F05D 2240/303* (2013.01); *F05D 2240/304* (2013.01); *F05D 2240/35* (2013.01); *F05D 2250/71* (2013.01); *Y02T 50/672* (2013.01); *Y02T 50/673* (2013.01)

(56) References Cited

U.S. PATENT DOCUMENTS

| | | | |
|---|---|---|---|
| 6,554,564 B1* | 4/2003 | Lord | F01D 5/141 415/119 |
| 7,547,186 B2* | 6/2009 | Schuster | F01D 5/141 415/119 |
| 7,845,158 B2* | 12/2010 | Udall | B64D 27/18 60/226.1 |
| 2002/0094276 A1* | 7/2002 | Ito | F01D 5/141 416/243 |
| 2008/0267772 A1* | 10/2008 | Harvey | F01D 5/141 415/191 |
| 2009/0304518 A1* | 12/2009 | Kodama | F01D 5/141 416/223 R |
| 2010/0254797 A1* | 10/2010 | Grover | F01D 5/143 415/1 |
| 2010/0260609 A1* | 10/2010 | Wood | F01D 5/141 416/223 R |
| 2011/0150660 A1* | 6/2011 | Micheli | F01D 5/141 416/223 R |
| 2012/0210715 A1* | 8/2012 | Shibata | F01D 5/141 60/670 |
| 2012/0243983 A1* | 9/2012 | Breeze-Stringfellow | F01D 5/141 415/208.2 |
| 2012/0244005 A1* | 9/2012 | Breeze-Stringfellow | F01D 5/141 416/223 A |
| 2013/0251520 A1* | 9/2013 | Barr | F01D 5/143 415/208.2 |

* cited by examiner

INCIDENCE-TOLERANT, HIGH-TURNING FAN EXIT STATOR

CROSS-REFERENCE TO RELATED APPLICATIONS

This application is a nonprovisional of, and claims priority to, and the benefit of U.S. Provisional Application No. 62/050,543, entitled "INCIDENCE-TOLERANT, HIGH-TURNING FAN EXIT STATOR," filed on Sep. 15, 2014, which is hereby incorporated by reference in its entirety.

FIELD

The present disclosure relates generally to a gas turbine engine and more specifically to compressor and turbine blades and/or vanes.

BACKGROUND

A gas turbine engine includes a compressor section with multiple rows or stages of stator vanes and rotor blades. In a gas turbine engine, the turbine rotor blades drive the compressor and an electric generator to generate electrical power. Some gas turbine engines include a fan positioned forward of the entrance to the compressor. This fan can provide additional propulsion to the gas turbine engine.

During operation, the fan rotates in order to provide propulsion. The fan may create high turning of the airflow and may create tangential or circumferential air flow. As the fan is positioned forward of the compressor, the air will not be flowing in an axial direction into the compressor from the fan. A set of stator blades may be provided at the inlet to the compressor in order to turn the air exiting the fan to an intended direction. This set of stator blades may be referred to as a fan exit stator.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

A gas turbine engine component is described. The gas turbine engine component includes an inner diameter edge, an outer diameter edge, a trailing edge and a leading edge. The leading edge has a positive (aft) aerodynamic sweep across substantially an entire span of the leading edge. The gas turbine engine component has a camber angle greater than 50 degrees across substantially an entire span of the component.

Also described is a gas turbine engine component for use as an airfoil. The gas turbine engine component includes an inner diameter edge having a first chord length and an outer diameter edge having a second chord length that is smaller than the first chord length. The component also includes a leading edge and a trailing edge. The leading edge is positioned closer to a flow of air at an intersection of the leading edge and the inner diameter edge than at an intersection of the leading edge and the outer diameter edge.

Also described is a gas turbine engine. The engine includes a combustor section, a turbine section, a fan and a compressor section. The compressor section or the turbine section has a first airfoil for receiving air. The first airfoil includes an inner diameter edge, an outer diameter edge and a trailing edge. The first airfoil also includes a leading edge, such that a length from the leading edge to the trailing edge decreases as the airfoil extends from the inner diameter edge to the outer diameter edge. The first airfoil also includes a suction surface extending and having a concave shape from the inner diameter edge to the outer diameter edge that is not symmetrical about a midspan of the airfoil. The first airfoil also includes a pressure surface opposite the suction surface.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, the "forward" and "aft" directions are defined in reference to the predominate flow direction through a gas turbine engine, with air generally flowing from the forward direction toward the aft direction.

Figure 1:
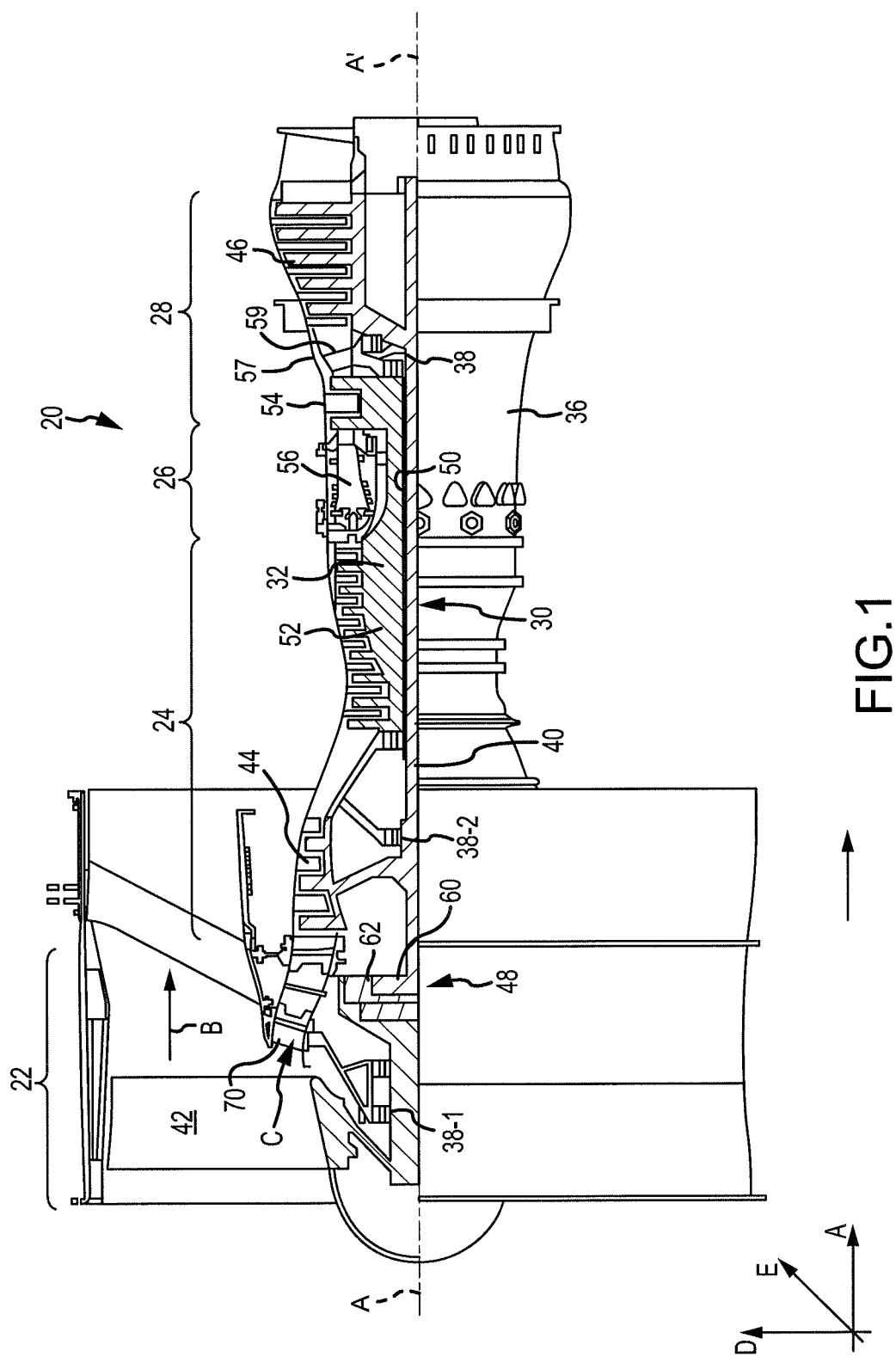
FIG. 1 is cross-sectional view of an exemplary gas turbine engine in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive air along a bypass flow-path B while compressor section 24 can drive air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including one-, two- and three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure (or second) compressor section 52 and high pressure (or second) turbine section 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

Positioned between fan 42 and low pressure compressor 44 is a fan exit stator 70. Fan exit stator 70 receives air from fan 42 and turns the air so that it flows towards low pressure compressor 44. Fan exit stator 70 includes at least one airfoil 80 stacked around axis Z. Generally, a stator airfoil 80 is stationary and does not rotate about axis A-A'. Airfoil 80 may be made from, for example, stainless steel, an austenitic nickel-chromium-based alloy such as Inconel® which is available from Special Metals Corporation of New Hartford, N.Y., USA, titanium, composite materials, and other suitable materials or the like.

Generally, the flow of air travels from A to A', so fan 42 is upstream from low pressure compressor 44, high pressure compressor 52 is downstream from low pressure compressor 44, etc. Additionally, the direction towards A from A' may be referred to as forward and the direction towards A' from A may be referred to as aft.

The core airflow C may be compressed by low pressure compressor section 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Gear architecture 48 may have a gear reduction ratio of greater than about 2.3 and low pressure turbine 46 may have a pressure ratio that is greater than about 2. In various embodiments, the bypass ratio of gas turbine engine 20 is greater than about ten (10:1). In various embodiments, the diameter of fan 42 may be significantly larger than that of the low pressure compressor section 44, and the low pressure turbine 46 may have a pressure ratio that is greater than about 5:1. Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other turbine engines including direct drive turbofans and turboshafts.

Figure 2:
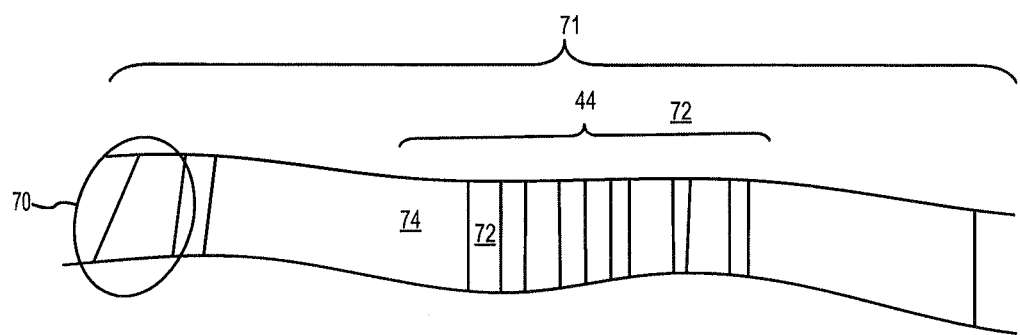
FIG. 2 is a cross-sectional view of a compressor portion of a gas turbine engine in accordance with various embodiments.

FIG. 2 is a cross-sectional view of the portion of FIG. 1 labeled 71. As illustrated, a front center body duct 74 is downstream from fan exit stator 70. Downstream of front center body duct 74 and before low pressure compressor 44 is an inlet guide vane 72.

Air enters fan exit stator 70 from fan 42. Fan exit stator 70 turns the air so that it has reduced tangential flow (swirl). Air flows around front center body duct struts and then around inlet guide vanes 72 prior to the air entering into low pressure compressor 44.

Fan exit stator 70 may include a plurality of airfoils. The airfoils may circumferentially surround the longitudinal axis A-A' illustrated in FIG. 1. The airfoils may be designed with high camber to impart high turning of the air—that is, the airfoils may be designed to turn a received airflow at a significant swirl angle, such as, for example, at, near or above 50 degrees. The airflow received at fan exit stator 70 may have a tangential component which the airfoils turn so that the air flows in the intended downstream direction. The intended direction may be the axial direction (i.e., along the longitudinal axis A-A').

Figure 3A:
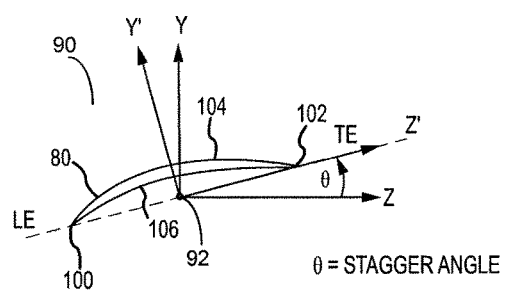
FIG. 3A illustrates a planar section of an airfoil in accordance with various embodiments.

FIG. 3A illustrates a planar section 90 of an airfoil 80 of fan exit stator 70. Illustrated on the planar section 90 is a suction side 104, a pressure side 106, a leading edge 100 and a trailing edge 102. An axis Z' between leading edge 100 and trailing edge 102, indicates the chord line. Angle θ indicates an angle between the chordwise direction Z' and the axis of rotation Z.

Planar section 90 has a centroid 92 that is the center of mass for planar section 90. Centroid 92 may be, for example, a center of gravity. Planar section 90 may be positioned in space by the three dimensional location of centroid 92. A traditional coordinate system may be used to position section 90, where the Z axis is parallel to the axis of rotation (A-A'), the X axis (illustrated in FIG. 3B) is the radial direction relative to the Z axis and the Y axis is tangential to the circumference of rotation. The X axis is also referred to as the stacking axis.

Axis Y' is an axis normal to the chord line Z' in the radial direction. Therefore, angle θ exists between axis Y' and axis Y. As utilized herein, geometric dihedral is a lean of airfoil 80 along axis Y'. Furthermore, bow is airfoil lean in the tangential direction, i.e., along axis Y. In other words, bow is defined as the angle between the airfoil stacking and the radial direction, in the tangential direction. Positive bow leans a blade toward the airfoil suction surface and can improve the radial pressure distribution and reduce secondary flow effects.

Figure 3B:
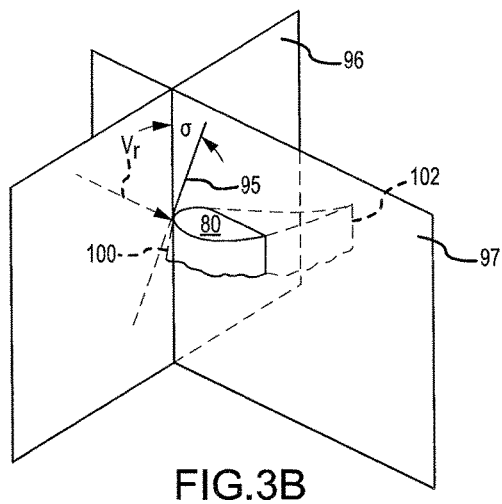
FIG. 3B illustrates an airfoil for describing aerodynamic sweep of the airfoil in accordance with various embodiments.

FIG. 3B illustrates a cross-sectional view of airfoil 80 for the purposes of illustrating aerodynamic sweep. As shown in FIG. 3B, the sweep angle σ at any arbitrary radius is the acute angle between a line 95 tangent to leading edge 100 of airfoil 80 and a plane 96 perpendicular to the relative velocity vector Vr. The sweep angle is measured in plane 97 which contains both the relative velocity vector Vr and the tangent line and is perpendicular to the plane 96.

Airfoil 80 discussed herein includes modifications that increase the robustness of airfoil 80 to variations in inlet flow from an upstream fan 42 into low pressure compressor 44. Air flow is directed towards fan exit stator 70 from fan 42. This airflow is received at fan exit stator 70 in a direction significantly different from the desired direction, so fan exit stator 70 is a high turning stator. Generally, fan exit stator 70 turns air at least 50 degrees. However, various embodiments of the present disclosure can be applied to a stator having a lower or higher turn profile. The modifications to airfoil 80 can also be applied to rotor blades or stator vanes positioned anywhere else in gas turbine engine 20.

When the air is received from fan 42 at fan exit stator 70, air flow can have a component of flow in the tangential direction. Various embodiments of the present disclosure address this substantially tangential air flow so that the air flow is turned to an intended, often axial, direction with minimal losses into low pressure compressor 44. This improvement is achieved by addressing, in various embodiments, the forward sweep of airfoil 80, the increased chord of airfoil 80 and/or the bow of airfoil 80. These features can alter the incoming air flow so that tangential airflow may be directed towards the inner diameter edge 110 or outer diameter edge 108.

After passing through front center body duct 74, the air flows through inlet guide vane 72 and into low pressure compressor 44. The rotors of low pressure compressor 44 may be counter rotating. With counter rotating rotors, inlet guide vane 72 may turn the air at a large angle in order to account for the counter rotation. Using the fan exit stator 70 disclosed herein, fan exit stator 70 may turn the air such that less turning is performed by inlet guide vane 72. This can reduce the pressure losses through inlet guide vane 72 as inlet guide vane 72 will turn air to a lesser degree.

Figure 4A:
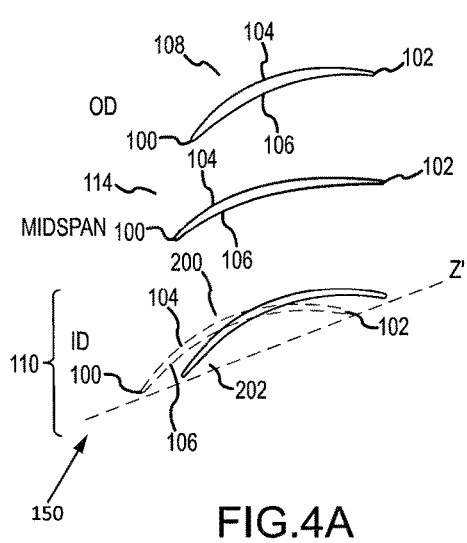
FIG. 4A illustrates a top view of an airfoil at three planar sections in accordance with various embodiments.

FIG. 4A illustrates planar section 90 of airfoil 80 at outer diameter edge 108, midspan portion 114 and inner diameter edge 110. FIG. 4A illustrates two different geometric sweep positions of inner diameter edge 110 of airfoil 80. The embodiment illustrated by inner diameter edge 202 illustrates an aft or rearward sweep of approximately 28 degrees while the embodiment illustrated by inner diameter edge 200 illustrates an aft sweep of approximately 12 degrees. As illustrated, airfoil 80 can be moved along the chord line Z' towards the airflow (indicated by arrow 150) in order to increase sweep. Sweep can also be increased by positioning leading edge 100 farther upstream while leaving trailing edge 102 in the same position, increasing the chord of airfoil 80 as well as the geometric sweep.

Figure 4B:
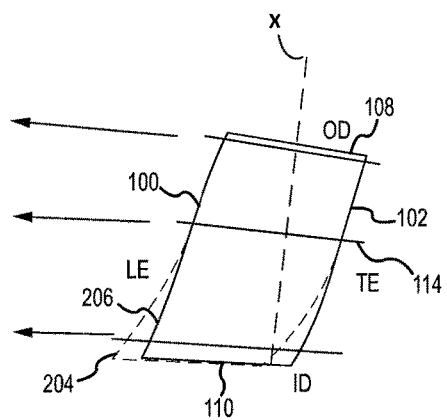
FIG. 4B illustrates a meridional view of an airfoil along a stacking axis in accordance with various embodiments.

FIG. 4B illustrates a meridional view of airfoil 80. Cross section 204 corresponds to inner diameter edge 200 with the increased sweep of 12 degrees. Cross section 206 corresponds to inner diameter edge 202 with an aerodynamic sweep of 28 degrees.

As illustrated, to increase sweep between inner diameter edge 110 and midspan portion 114 (aft sweep), the planar sections closer to inner diameter edge 110 can be moved forward (upstream) while leaving the portion between midspan portion 114 and outer diameter edge 108 alone. Also, to increase sweep between inner diameter edge 110 and midspan portion 114, leading edge 100 can be extended forward (i.e., increased chord) while leaving the portion between midspan portion 114 and outer diameter edge 108 alone. Increasing the chord length reduces airfoil loading, thus reducing the likelihood of airfoil flow separation under high incidence conditions.

Returning to FIG. 2, an increased chord is illustrated near inner diameter edge 110 of fan exit stator 70. By increasing the chord, loading is reduced.

Figure 5A:
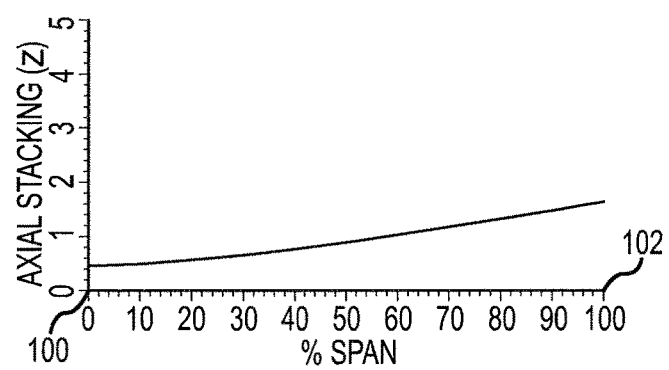
FIG. 5A illustrates axial stacking of an airfoil across the span of the airfoil in accordance with various embodiments.

FIG. 5A illustrates axial stacking of airfoil 80 across the span of airfoil 80. The axis labeled "% span" represents the spanwise distribution of airfoil 80. Zero percent (0%) represents inner diameter edge 110 of airfoil 80 and 100% represents outer diameter edge 108 of airfoil 80.

Figure 8A:
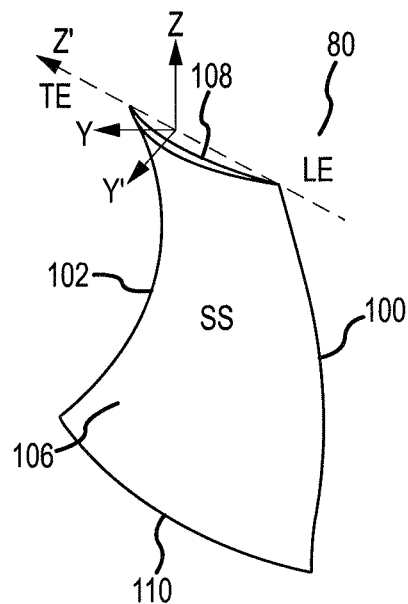
FIG. 8A illustrates a perspective view of an airfoil from a suction surface of the airfoil in accordance with various embodiments.
Figure 9A:
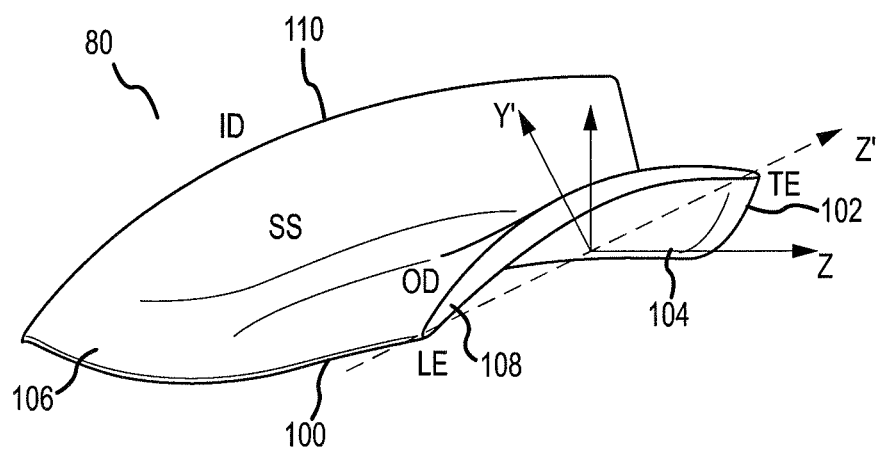
FIG. 9A illustrates perspective views of an airfoil from a leading edge of the airfoil and an outer diameter edge of the airfoil in accordance with various embodiments.

FIG. 5A illustrates stacking along axis Z (illustrated in FIGS. 3A, 8A and 9A). In order to determine axial stacking, centroid 92 is disposed along axis Z in either the positive or negative direction. Each planar section 90 can be stacked based on the coordinate of its centroid 92. The graph illustrated in FIG. 5A illustrates the position of centroid 92 along the Z axis. As illustrated, the axial stacking of airfoil 80 increases throughout the span of airfoil 80.

Figure 5B:
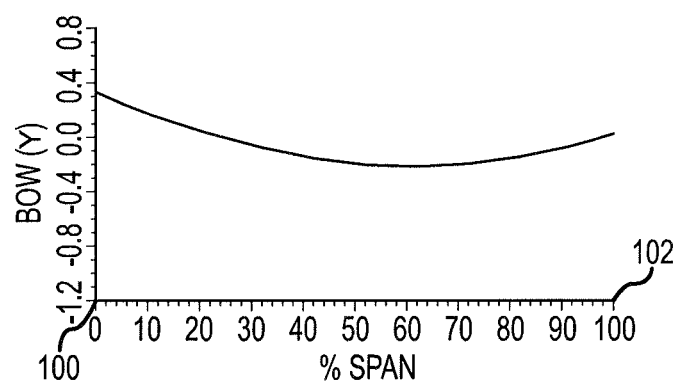
FIG. 5B illustrates tangential stacking, or bow, of an airfoil across the span of the airfoil in accordance with various embodiments.

FIG. 5B illustrates geometric sweep of airfoil 80 across the span of airfoil 80. Geometric sweep of airfoil 80 is illustrated by the positioning of centroid 92 along the Z' axis (parallel to the chord line of airfoil 80). Of note in FIG. 5B, the geometric sweep stacking almost doubles as the span increases from inner diameter edge 110 to outer diameter edge 108. This represents that leading edge 100 near inner diameter edge 110 is extended, increasing the chord of airfoil 80. Towards outer diameter edge 108, the chord becomes more constant, which is illustrated by the flatter representation of geometric sweep stacking in FIG. 5B.

FIG. 5B illustrates tangential stacking, or bow, across the span of airfoil 80. Bow is illustrated by the positioning of centroid 92 along the Y axis. Bow represents stacking of airfoil in the tangential direction (Y).

As illustrated in FIG. 5B, the bow of airfoil 80 is not symmetric about the 50% span line. Instead, the bow is decreasing from the inner diameter edge 110 to about the 60% span line. Here bow is weighted to be higher near inner diameter edge 110 and lower near outer diameter edge 108. Airfoil 80 thus would likely induce higher radial flow movement towards inner diameter edge 110 than outer diameter edge 108.

Figure 5C:
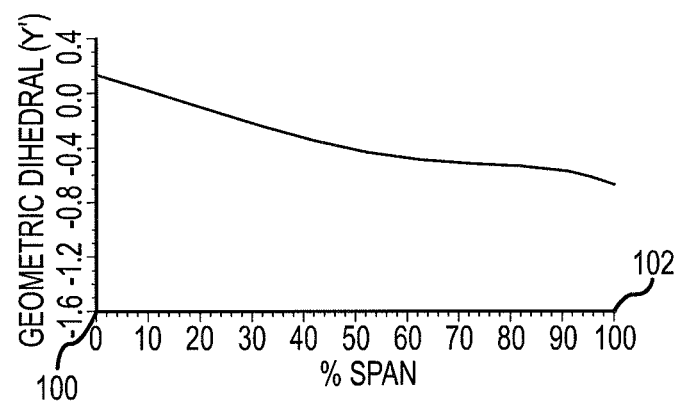
FIG. 5C illustrates geometric dihedral of an airfoil across the span of the airfoil in accordance with various embodiments.

FIG. 5C illustrates geometric dihedral across the span of airfoil 80. Dihedral is illustrated by the positioning of centroid 92 along the Y' axis. Dihedral represents lean of airfoil 80 in a direction normal to geometric sweep. As illustrated, the dihedral of airfoil 80 is decreasing throughout the span, starting slightly above the zero point and gradually decreasing.

Figure 6:
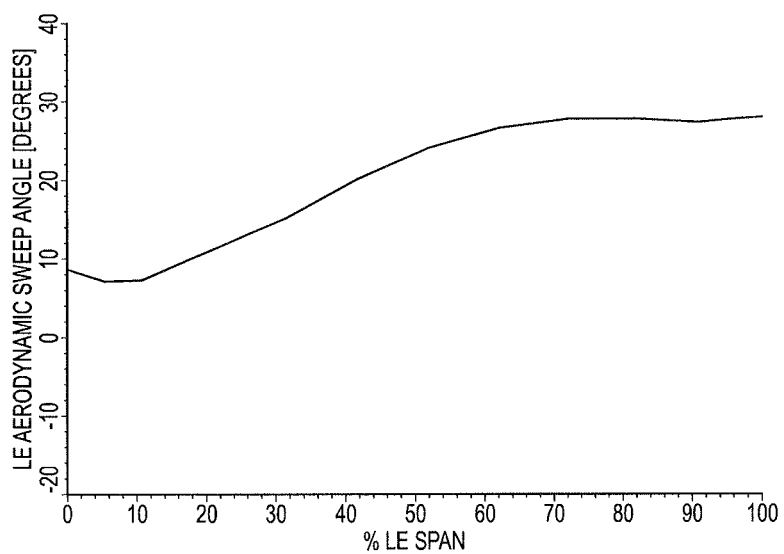
FIG. 6 illustrates the leading edge aerodynamic sweep angle of an airfoil in accordance with various embodiments.

FIG. 6 illustrates the aerodynamic sweep angle of airfoil 80. The aerodynamic sweep angle is determined based on stacking across the Z' axis illustrated in FIG. 5B relative to air flow stream surface 112. By increasing the chord at leading edge 100, as well as moving airfoil 80 planar sections forward in the sweep direction near inner diameter edge 110, the position of leading edge 100 of airfoil 80 is moved to create aft sweep. The forward positioning contributes to a higher aerodynamic sweep angle. In FIG. 6, the aerodynamic sweep angle of airfoil 80 is positive throughout the span of airfoil 80. Positive aerodynamic sweep redistributes flow towards inner edge 100.

Figure 7A:
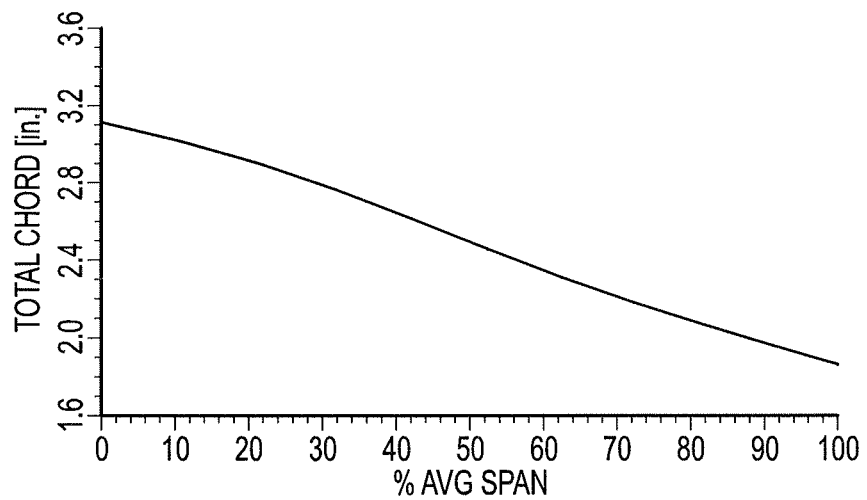
FIG. 7A illustrates total chord of an airfoil across the span of the airfoil in accordance with various embodiments.

FIG. 7A illustrates the total chord length across the span of airfoil 80. As illustrated, the chord of airfoil 80 decreases from inner diameter edge 110 to outer diameter edge 108. For example, the chord of airfoil 80 may be nearly 50% larger at inner diameter edge 110 than at outer diameter edge 108. This represents a significant increase in chord at inner diameter edge 110 as compared to outer diameter edge 108. It is shown how this change in total chord affects airfoil 80 on FIG. 8B. As illustrated, trailing edge 102 of airfoil 80 does not necessarily mirror the forward positional shift of leading edge 100 from inner diameter edge 110 to outer diameter edge 108.

Figure 7B:
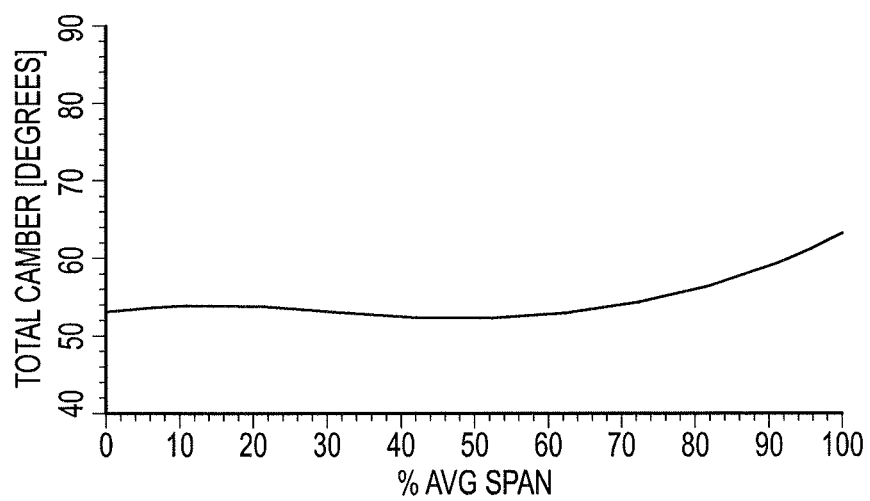
FIG. 7B illustrates total camber of an airfoil across the span of the airfoil in accordance with various embodiments.

FIG. 7B illustrates total camber of airfoil 80 along its span. Camber represents the change in angle from leading edge 100 to trailing edge 102. As illustrated, the camber of airfoil 80 is greater than 50 degrees throughout the span.

Also illustrated, the camber increases as the span approaches outer diameter edge 108. This can be seen in FIG. 4A. Outer diameter edge 108 has total turning from leading edge 100 to trailing edge 102 that is higher than the midspan portion 114 and inner diameter edge 110.

FIG. 8A illustrates a perspective view of airfoil 80 from suction surface 106. FIG. 8A also includes the Y, Z, Y' and Z' axes for reference. In FIG. 8A, the bow of airfoil 80 is not symmetric about the 50% span line. The bow is greater at inner diameter edge 110 than it is at outer diameter edge 108. This is shown by the curvature of airfoil 80 about suction surface 106 in the Y direction. Suction surface 106 is curved in the positive direction near inner diameter edge 110 for 20% span and near outer diameter edge 108 for 10% span. This illustrates the change in bow illustrated in FIG. 5B.

Figure 8B:
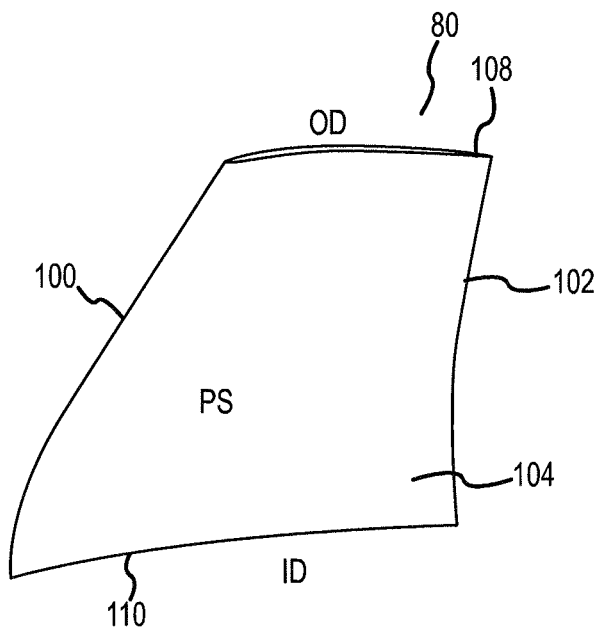
FIG. 8B illustrates a cross-sectional view of an airfoil from a pressure surface of the airfoil in accordance with various embodiments.

FIG. 8B illustrates a perspective view of airfoil 80 from pressure surface 104. FIG. 8B illustrates, in an axial projection, how leading edge 100 positioning for sweep affects airfoil 80. As illustrated, the position of leading edge 100 is substantially forward near inner diameter edge 110 for airfoil 80. As illustrated, the chord of airfoil 80 is greater at inner diameter edge 110 than at outer diameter edge 108. This represents the chord changes in FIG. 7A. This positioning of leading edge 100 contributes to an aerodynamic sweep that is positive throughout the span of airfoil 80.

FIG. 9A illustrates a perspective view of airfoil 80 from leading edge 100 and outer diameter edge 108. FIG. 9A also includes the Y, Z, Y' and Z' axis for reference. Suction surface 106 is illustrated. Again, the bow of airfoil 80 is illustrated by the curve of airfoil 80 from inner diameter edge 110 to outer diameter edge 108.

Figures 9B, 9C:
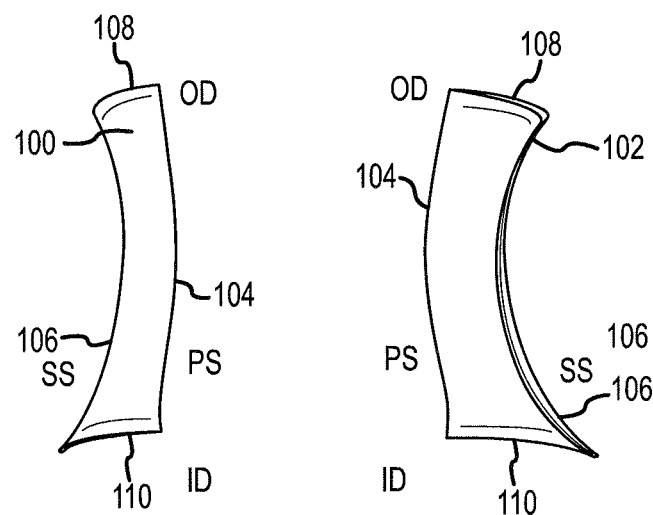
FIG. 9B illustrates a front view of an airfoil from a leading edge of the airfoil in accordance with various embodiments.
FIG. 9C illustrates a rear view of an airfoil from a trailing edge of the airfoil in accordance with various embodiments.

FIG. 9B illustrates a front view of airfoil 80 from leading edge 100, and FIG. 9C illustrates a rear view of airfoil 80 from trailing edge 102. FIGS. 9B and 9C also illustrate the bow of airfoil 80.

The combination of features of airfoil 80, in particular the aft sweep, the chord and the asymmetric bow, reduce pressure loss through fan exit stator 70 relative to conventional systems. Often, highly loaded flow separates on an endwall adjacent inner diameter edge 110. By incorporating these features, flow is pulled towards inner diameter edge 110, reducing pressure loss and flow defect in the inner diameter edge region.

This combination of features also improve turning in compressor section 24. Without these features, a traditional airfoil would have non-optimal exit angles, resulting in higher tangential velocities. The features of airfoil 80 described herein provide appropriate turning of the flow. This optimal turning results in lower tangential velocities, so the flow will be approaching compressor section 24 with a swirl angle closer to the intended flow direction.

Benefits, other advantages, and solutions to problems have been described herein with regard to specific embodiments. The scope of the disclosure, however, is provided in the appended claims.

The invention claimed is:

1. A fan exit stator comprising:
   an inner diameter edge;
   an outer diameter edge;
   a trailing edge; and
   a leading edge having a positive aerodynamic sweep across substantially an entire span of the leading edge,
   wherein the fan exit stator has a camber angle greater than 50 degrees across substantially an entire span of the fan exit stator,
   wherein a bow of the fan exit stator is greater at the inner diameter edge than at the outer diameter edge, and
   wherein a chord of the fan exit stator continuously decreases from the inner diameter edge to the outer diameter edge.

2. The fan exit stator of claim 1, wherein a first chord length of the fan exit stator is larger at the inner diameter edge than a second chord length of the fan exit stator at the outer diameter edge.

3. The fan exit stator of claim 2, wherein the first chord length is at least 20 percent larger than the second chord length.

4. The fan exit stator of claim 3, wherein the first chord length is at least 50 percent larger than the second chord length.

5. The fan exit stator of claim 1, wherein the bow of the fan exit stator is asymmetric around a midspan of the fan exit stator.

6. The fan exit stator of claim 1, wherein a dihedral of the fan exit stator decreases continuously from the inner diameter edge to the outer diameter edge.

7. The fan exit stator of claim 1, wherein the fan exit stator is a stator vane.

8. The fan exit stator of claim 7 wherein the fan exit stator receives air flow directly from a fan.

9. A fan exit stator airfoil, the fan exit stator airfoil comprising:
an outer diameter edge having a first chord length;
an inner diameter edge having a second chord length that is larger than the first chord length;
a trailing edge;
a leading edge having a positive aerodynamic sweep across substantially an entire span of the leading edge;
wherein a bow of the fan exit stator airfoil is asymmetric around a midspan of the fan exit stator airfoil.

10. The fan exit stator airfoil of claim 9, wherein the second chord length is at least 20 percent larger than the first chord length.

11. The fan exit stator airfoil of claim 10, wherein the second chord length is at least 50 percent larger than the first chord length.

12. The fan exit stator airfoil of claim 9, wherein the fan exit stator airfoil is a stator that receives air flow directly from a fan.

13. The fan exit stator airfoil of claim 9, further comprising a suction surface that is radially concave towards the suction surface near an endwall.

14. The fan exit stator airfoil of claim 13, wherein the suction surface extends further in the tangential direction at the inner diameter edge than at the outer diameter edge.

15. The fan exit stator airfoil of claim 9, wherein the fan exit stator airfoil is configured to turn a flow of air at least 50 degrees throughout a span of the fan exit stator airfoil.

16. A gas turbine engine comprising:
a combustor section;
a turbine section;
a fan; and
a compressor section,
wherein the compressor section or the turbine section has
a fan exit stator airfoil for receiving air, the fan exit stator airfoil including:
an inner diameter edge,
an outer diameter edge,
a trailing edge,
a leading edge, such that a length from the leading edge to the trailing edge decreases as the fan exit stator airfoil extends from the inner diameter edge to the outer diameter edge and a positive aerodynamic sweep across substantially an entire span of the leading edge,
a suction surface extending and having a concave shape from the inner diameter edge to the outer diameter edge that is asymmetrical about a midspan of the fan exit stator airfoil, and
a pressure surface opposite the suction surface.

* * * * *